(12) United States Patent
Hottinen et al.

(10) Patent No.: US 7,088,699 B1
(45) Date of Patent: Aug. 8, 2006

(54) CELLULAR RECEIVER AND RECEPTION METHOD

(75) Inventors: Ari Hottinen, Espoo (FI); Jorma Lilleberg, Oulu (FI); Antti Toskala, Helsinki (FI); Harri Holma, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/445,808

(22) PCT Filed: Jun. 23, 1998

(86) PCT No.: PCT/FI98/00548

§ 371 (c)(1),
(2), (4) Date: Feb. 29, 2000

(87) PCT Pub. No.: WO99/01946

PCT Pub. Date: Jan. 14, 1999

(30) Foreign Application Priority Data

Jun. 23, 1997 (FI) .................................. 972704

(51) Int. Cl.
*H04B 1/707* (2006.01)
*H04B 7/216* (2006.01)

(52) U.S. Cl. .................. 370/342; 370/441; 375/142
(58) Field of Classification Search ............. 370/342, 370/320, 335, 328, 329, 334, 252, 441; 375/130, 375/142, 143, 144, 147, 150
See application file for complete search history.

(56) References Cited

U.S. PATENT DOCUMENTS

| | | | | |
|---|---|---|---|---|
| 5,218,619 A | * | 6/1993 | Dent ........................... | 370/209 |
| 5,394,434 A | * | 2/1995 | Kawabe et al. ............. | 370/342 |
| 5,463,660 A | * | 10/1995 | Fukasawa et al. .......... | 370/342 |
| 5,579,304 A | * | 11/1996 | Sugimoto et al. .......... | 370/342 |
| 5,644,592 A | * | 7/1997 | Divsalar et al. ............. | 375/147 |
| 5,719,899 A | * | 2/1998 | Thielecke et al. .......... | 375/144 |
| 5,757,845 A | * | 5/1998 | Fukawa et al. ............. | 375/152 |
| 5,970,060 A | * | 10/1999 | Baier et al. ................. | 370/342 |

FOREIGN PATENT DOCUMENTS

| | | |
|---|---|---|
| EP | 0711044 | 10/1995 |
| EP | 0849886 | 12/1997 |
| FI | 97180 | 10/1996 |
| WO | 94 00917 | 1/1994 |
| WO | 96 11534 | 4/1996 |

OTHER PUBLICATIONS

Shimon Moshavi. Multi-User Detection for DS-CDMA Communications. Oct. 1996. IEEE Communications Magazine. pp. 124-136.*

Thielecke et al., "Interference Reduction Applied to Channel Estimation in CDMA Systems", Proc. of Vehicular Tech. Conf., 1994, pp. 752-756.

* cited by examiner

*Primary Examiner*—John Pezzlo
*Assistant Examiner*—Gregory B Sefcheck
(74) *Attorney, Agent, or Firm*—Pillsbury Winthrop Shaw Pittman LLP

(57) ABSTRACT

The invention relates to a reception method and a receiver in a system comprising in each cell a base station communicating with terminals located in its area. A received signal comprises a sum signal of signals originating from several transmitters. The receiver comprises means for performing interference elimination and a simultaneous multi-user detection to the signal and means for searching signal parameters. In order to reduce the required computational capacity, the receiver further comprises means for removing the effect of the signals of the known users from the receives sum signal, and means for estimating the parameters of the unknown signals from a narrowband residual signal.

12 Claims, 1 Drawing Sheet

CELLULAR RECEIVER AND RECEPTION METHOD

FIELD OF THE INVENTION

The invention relates to a reception method in a cellular radio system comprising in each cell at least one base station communicating with terminals located in its area and in which system Code Division Multiple Access is employed, and in which method a received signal comprises a sum signal of signals originating from several transmitters, said signals comprising symbols, and interference elimination and a simultaneous multi-user detection are performed to said signal and in which method an estimate is generated for the received signal.

The invention further relates to a reception method in a cellular radio system comprising in each cell at least one base station communicating with terminals located in its area and in which system Code Division Multiple Access is employed, and in which method a received signal comprises a sum signal of signals originating from several transmitters, and interference elimination and a simultaneous multi-user detection are performed to said signal.

DESCRIPTION OF THE PRIOR ART

The present invention is applicable in radio systems of several different types, for example CDMA systems. The CDMA is a multi-access method based on spread spectrum technique, and the method has recently been applied in cellular radio systems in addition to the previous FDMA and TDMA systems. The CDMA has several advantages over the previous methods, such as the simple frequency planning and spectral efficiency.

In the CDMA method, a narrowband user data signal is multiplied to a relatively broad band by a spreading code which is significantly more broadband than the data signal. Bandwidths used in the known test systems are, for example, 1.25 MHz, 10 MHz and 25 MHz. In connection with the multiplication, the data signal is spread over the whole band to be used. All users transmit simultaneously in the same frequency band. A unique spreading code is used on each connection between a base station and a mobile station, and the user signals can be distinguished from one another at the receivers on the basis of the spreading code of each user. The aim is to select the spreading codes in such a manner that they are mutually orthogonal, in other words they do not correlate with one another.

The correlators in the CDMA receivers implemented in a conventional way synchronize with a desired signal which is identified on the basis of a spreading code. The data signal is restored to the original band at the receiver by remultiplying it by the same spreading code as in the transmitting phase. The signals that are multiplied by some other spreading code do not, ideally, correlate and restore to the narrow band. Hence, they appear as noise to the desired signal. The aim is to detect the signal of a desired user from among several interfering signals. In practice, spreading codes are not orthogonal and other users' signals impede the detection of the desired signal by distorting the received signal non-linearly. This mutual interference between the users is called multiple access interference. Similar multiple access interference occurs also in other multiple access methods, such as the TDMA and FDMA.

Numerous reception methods have been developed to eliminate the signal quality degradation caused by multiple access interference. Among these methods are the conventional single-user reception and the methods enabling a simultaneous multi-user detection. In the conventional single-user reception, the received transmission is correlated by a linear, matched filter ignoring all other signals comprised in the transmission than the signal of the desired user. This reception method is rapid to implement but extremely inefficient in multiple access interference elimination.

Methods have been disclosed in which multiple access interference is eliminated from a broadband signal and detection, in turn, is performed to a narrowband signal from which a spreading code is decoded. Such a method is disclosed in Thielecke, *Interference. Reduction Applied to Channel Estimation in CDMA Systems*, Proceedings of Vehicular Technology Conference, 1994, Stockholm, which is incorporated herein by reference. However, in practice such methods are difficult to implement since signal processing is performed broadband, in other words on the chip level.

An optimal multi-user detector (MUD) comprises a number of linear matched filters and a Viterbi detector. A known linear multi-user detector is the least squares detector (LS detector) which is called a decorrelating detector. This detector requires data about the mutual cross-correlations of the codes used.

Furthermore, a drawback of the known methods is that they are developed for static systems, in other words for situations in which the number of users is unchanged. In practice, however, radio systems comprise numerous factors that vary with time and which should be taken into account when designing receivers. New users are introduced to a cell in connection with handover or new calls. The number and quality of interfering signals supplied from adjacent cells also vary constantly.

BRIEF DESCRIPTION OF THE INVENTION

It is an object of the present invention to provide a reception method and a receiver by which the disadvantages of the previous solutions can be avoided. The solution of the invention enables a rapid and accurate synchronization on account of which the quality of connection setup and interference elimination is improved.

This is achieved by a method of the type described in the introduction, the method being characterized in that the estimate comprises one or more estimates of a received user signal, and that the effect of the symbols estimated on the symbol level is subtracted from the received sum signal, whereby a narrowband, symbol-level residual signal is obtained.

This is also achieved by a method of the type described in the introduction, the method being characterized in that an estimate comprises one or more estimates of a received user signal, and that the received sum signal is correlated by a particular spreading code, whereby a first symbol-level signal is obtained, and that the computed estimate is correlated by the same spreading code, whereby a second symbol-level signal is obtained, and that the second symbol-level signal is subtracted from the first symbol-level signal, whereby a narrowband, symbol-level residual signal is obtained.

The invention further relates to a receiver in a cellular radio system comprising in each cell at least one base station communicating with terminals located in its area, in which method a received signal comprises a sum signal of signals originating from several transmitters, said receiver comprising means for performing interference elimination and a simultaneous multi-user detection to the signal and means for searching signal parameters. The receiver of the invention is characterized in that the receiver further comprises means for removing the effect of the signals of the known users, and means for estimating the parameters of the unknown signals from a narrowband residual signal.

Several advantages can be achieved by the method of the invention. The method of the invention can rapidly notice dynamic changes, such as the signals of new users or unknown intruders, in the propagation environment of a radio path. In most cases, the solution of the invention also requires less processing capacity than the previous solutions. The solution of the invention requires no major changes in the existing equipment, but it can also be put to use at low cost in the current systems. The preferred embodiments of the invention are disclosed in the dependent claims.

BRIEF DESCRIPTION OF THE DRAWINGS

The invention will be described in closer detail in the following with reference to the examples in accordance with the accompanying drawings, in which.

DETAILED DESCRIPTION OF THE INVENTION

The present invention can be applied to radio systems of several different types, for example CDMA systems. In the following, the invention will be described in connection with the CDMA system without restricting to it.

Figure 1:
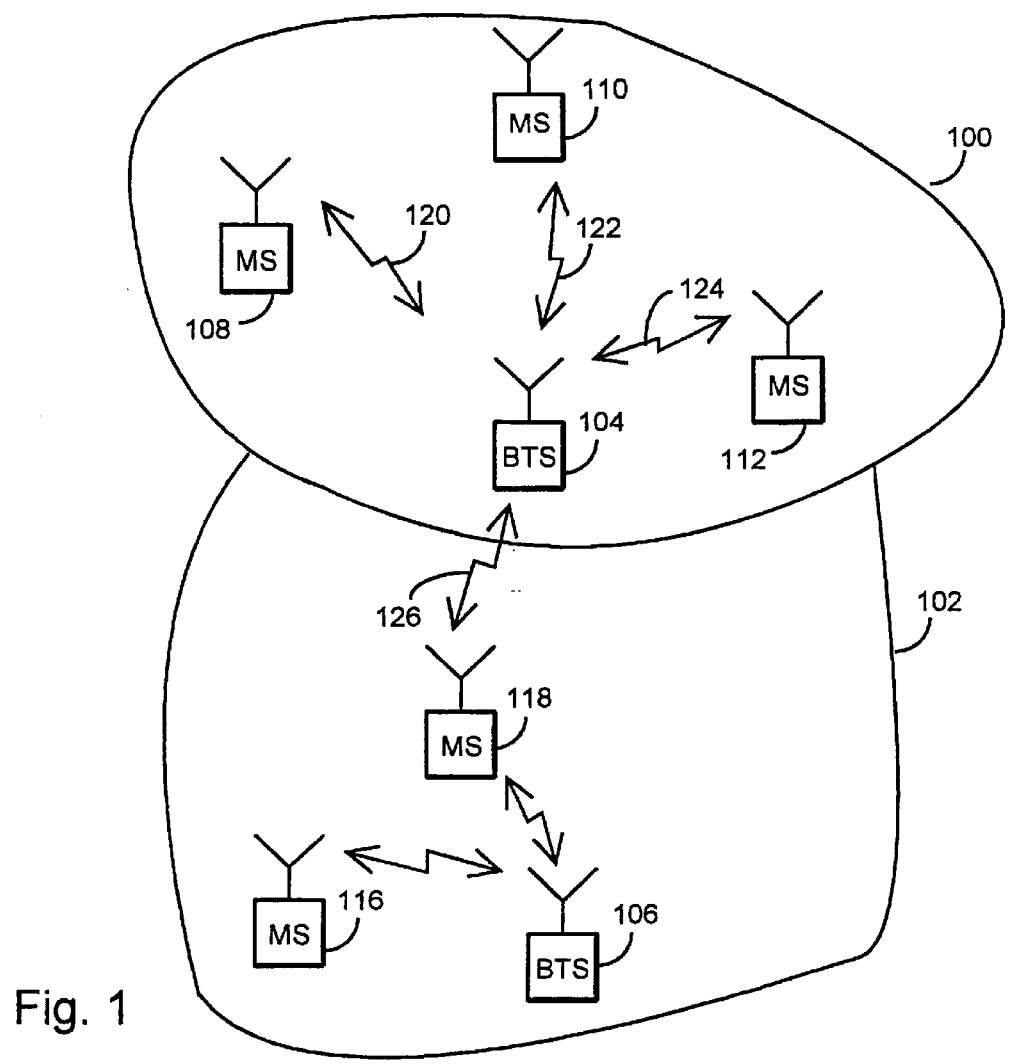
FIG. 1 shows a system to which the invention can be applied.

FIG. 1 illustrates the structure of a typical cellular radio system. The figure shows two cells 100, 102, each comprising a base station 104, 106. The cell 100 comprises three active terminals 108 to 112 communicating with the base station 104. Correspondingly, the cell 102 comprises two active terminals 116, 118 communicating with the base station 106.

The signals of the terminals are received at the base stations and a simultaneous multi-user detection is performed to the received signals. Let us examine the situation of the base station 104. The base station thus communicates with the active terminals 108 to 112 located in its area whose signals 120 to 124 it receives. The sum signal received by the base station antenna also comprises a signal 126 of the terminal located in an adjacent cell, which signal is an interfering one for the receiver. The base station 104 performs the simultaneous multi-user detection by a known MUD algorithm. It thus detects the desired signals 120 to 124 here and removes the effect of the interfering signal 126 from the desired signals. The effect of all other signals, not only the signal supplied from the adjacent cell can, of course, be removed from each desired signal. This depends on implementation restrictions and the reliability of the estimate.

Figure 2:
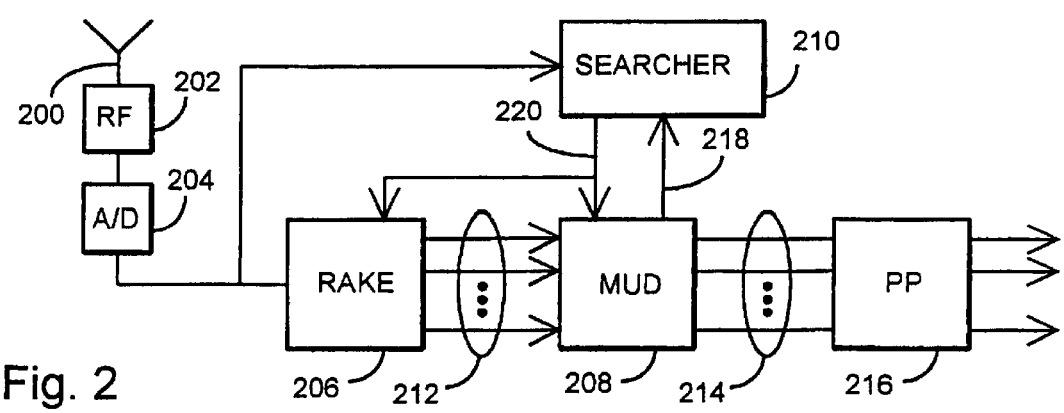
FIG. 2 is a block diagram illustrating the structure of the receiver of the invention.

Let us next take a closer look at the receiver, in this example base station, of the invention by means of the block diagram in FIG. 2. The receiver comprises an antenna 200 which receives a sum signal of signals originating from several transmitters. The antenna can be a single antenna or an antenna array comprising two or more antennas. From the antenna, the signal is conveyed to radio frequency parts 202 in which the signal is typically amplified and converted into an intermediate or baseband frequency. From the radio frequency parts the signal is conveyed to sampling means 204, in other words to an analogue/digital converter in which the signal is converted into a digital form by taking samples of it at a desired sampling frequency.

From the sampling means 202 the signal is conveyed to a correlator bank 206 comprising a number of correlators or matched filters, each synchronizing with one signal component of a sum signal, which they identify on the basis of the signal parameters. The correlators decode the spread coding of the signals, in other words convert it into narrowband. Narrowband signals 212 are conveyed to a detection unit 208 in which a simultaneous multi-user detection is performed. The soft decisions 214 of the desired signal symbols obtained from the detection unit are conveyed to a post-processing unit 216 and forwarded to the other parts of the receiver. In the post-processing unit 216 the signal is deinterleaved and channel-decoded, for example. How the signal is processed after the detection unit is not relevant.

The signal parameters required by the correlator bank comprise the spreading code, they data rate, the relative delay and optionally the amplitude used in the signal transmission. When any of the parameters is changed, the correlator must be updated. The spreading code may change when a user leaves or enters a cell, which may occur in connection with handover or switch-on.

Since data on these parameters is important, the receiver must, of course, monitor and estimate these changing parameters. This is performed in a so-called searcher unit 210. The sum signal received from the sampling means 202 is conveyed, in addition to the correlator bank, to the searcher unit 210 which searches for new signal components and their parameters.

The signal parameters estimated and computed by the searcher unit 210 comprise the number of active users, the physical channels, the channel impulse response, the frame parameters and their functions. A correlation matrix between the codes is also computed in the searcher unit. The correlation matrix must be updated when dynamic changes occur on the channel, when the delays and bit rates change. The detection unit uses these data to compute the correlations between the signals in the simultaneous multi-user detection and interference elimination.

In the solution of the invention the operation of the searcher block is significantly alleviated in such a manner that, in addition to the received sum signal, a signal in which the effect of the signals of the known users is removed from the received sum signal is introduced as an input to the searcher unit. The parameters of the unknown signals can be significantly more easily estimated from this residual signal than from the original sum signal. The rapid operation of the receiver is important here, especially in connection with packet-form data.

When a new signal is found and its parameters are identified, two alternatives exist. If the signal is an interfering one, for example a signal of a terminal belonging to a neighboring cell, the effect of the signal found by means of the estimated parameters is removed from the received signal. If, however, the signal is a desired one, for example a terminal transferring to the area of the cell of the base station and desiring to set up a macrodiversity connection to the base station, the signal found by the estimated parameters is detected by using a simultaneous multi-user detection.

The estimation of the unknown signals may involve different alternatives. A receiver may have some advance information on the signals to be searched. The signals may be supplied from a neighboring cell, for example, whereby the base station of the neighboring cell can transmit the parameters of potential interfering signals in advance. In such a case, the spreading code may be known while the delay is unknown, for example. On the other hand, in a synchronous system the delay may be known while the spreading code is unknown. It is also possible that no parameter of an interfering signal is known in advance. On the other hand, in packet traffic or in connection with a random access transmission the code is known while the delay is unknown, for example.

When some of the parameters of the signals to be searched are known, these data are utilized when other parameters are searched, which, of course, makes the search more rapid.

For example, if a number of potential intruders is known, it is possible to compute the cross-correlations between the desired users and the potential interfering signals in advance. Next, utilizing the estimated symbols, known delays and codes, the effect of the known signals is removed from the received sum signal. Next, in order to reduce the search window, the unknown signals are searched from the residual signal by utilizing the advance data.

Let us next take a closer look at the mathematical basis of the solution of the invention. The received signal r is described by the formula $$r = S_1 A_1 b_1 + n$$

in which matrix S comprises at time t all codes of the active users, A comprises at time t all channel coefficients of the active users, b comprises at time t all bits of the active users and n is noise. When a new user is introduced to a system, a new column which must be identified appears in matrix S in the above formula.

A known method to solve the problem is to correlate the received signal by a known code $s_2$ which does not belong to matrix S:

$$s_2^H r.$$

On the basis of the correlation it is decided whether the new signal has been transmitted by using the particular code and at what delay the signal has been received. The codes and delays are examined one by one until the transmitter is found out by means of the correlation result.

Another method, which is disclosed in Thielecke above, is to make a decision on performing interference elimination on the basis of a broadband residual signal:

$$s_2^H [r - \hat{S}_1 \hat{A}_1 \hat{b}_1],$$

in which the broadband estimate is subtracted from the received signal.

A preferred embodiment of the invention is based on processing the narrowband signal, in other words the signal which is obtained from the outputs of rake branches. In accordance with the method, the estimate of the known signal is generated first $$\hat{r}_1 = \hat{S}_1 \hat{A}_1 \hat{b}_1.$$

Next, the residual signal is correlated by the code to be searched $$\hat{z}_{12} = \hat{s}_2^H [\hat{S}_1 \hat{A}_1 \hat{b}_1] = \hat{S}_2^H \hat{r}_1,$$

whereby an interference estimate is obtained for the narrowband signal. Next, the estimated narrowband signal is subtracted from the output of the $\hat{z}_{12}$ rake branches:

$$z_{rw} = z_2 - \hat{z}_{12}$$

and a decision is made on the narrowband residual signal. For the user k, the decision is made from the signal $$z_{res} + \hat{a}_k \hat{b}_k,$$

in which $\hat{a}_k$ is the channel estimate of one user.

The decision can be based on the strength of the residual signal or the channel estimate or amplitude estimate, for example. The residual signal can be combined on the symbol level either coherently or incoherently. The coherent combining can be implemented by transmitting a known training sequence or by means of a decision feedback. If a new signal does not comprise $s_2$, the signal-to-noise ratio of the residual signal is poor, and, in the contrary case, the operation reduces interference and improves the signal-to-noise ratio significantly. A great advantage of the method of the invention is that there is no need to compute the cross-correlation at any stage, so the method is significanuy simpler to implement, even if the code changes symbol by symbol. On the other hand, if the code remains steady, i.e. unchanged symbol by symbol, the above computation can still be implemented in such a manner that the cross-correlation matrix $S_2^H * S_1$ is computed first and only after it $\hat{A}_1 \hat{b}_1$. Since the code does not change, the amount of computation does not increase significantly.

The computation of the narrowband residual signal is still rather a demanding procedure, so the methods that enable less frequent computation are advantageous. A way to do this is to apply a conventional correlator $$s_2^H r,$$

by means of which a number of test delays is searched, among which the correct delay/code most probably is. A more accurate delay/code estimate based on the residual signal $Z_{rw}$ can be computed for all test delays obtained in this way. Complexity can thus be reduced by the coefficient $|L_1|/|L_2|$, where $|L_1|$ is the number of the searched test delays and $|L_2|$ the number of all possible delays. The computation can, of course, be performed to several test delays in parallel or sequentially one delay at a time.

In another preferred embodiment of the invention, at least one estimate of an interfering signal is removed from the received signal and the parameters of the unknown signals are estimated from the residual signal obtained. This alternative is advantageous when a random access signal is involved, for example. In such a case, the interfering signal only produces a one-time effect. The effect of the signal can be removed from the received transmission, and the parameters of the unknown signals are estimated from the less interfering residual signal obtained in this way. The interfering signal estimate comprises the complex amplitude, channel coefficient, delay, etc.

Let us next take a closer look at the structure of the receiver, in this example the base station, of the invention by means of the block diagram in FIG. 2. The receiver thus comprises the correlator bank 206 which comprises a number of correlators or matched filters whose output comprises the signals 212 that are multiplied by known spreading codes and converted into narrowband. The detection means 208 perform interference elimination and the simultaneous multi-user detection to the signals 212.

The receiver further comprises the means 210 for searching signal parameters. The received sum signal is introduced to the searcher means as one input. From the detection means 208, data 218 on the known signal parameters is conveyed to the searcher means. The signal 218 comprises data on the number of the detected signals, the preliminary delay estimates for each signal and the active code set, for example. The searcher means remove the effect of the signals of the known users from the received sum signal and estimate the parameters of the unknown signals from the residual signal, as described above. The parameters 220 computed by the searcher means are conveyed to the correlator bank 206 and to the detection unit 208 to be utilized. The searcher means 210 and the detection means 208 can be advantageously implemented in practice by software, using a signal processor or a multi-purpose processor or, alternatively, discrete components or ASIC circuits.

Even though the invention is described above with reference to the example in accordance with the accompanying drawings, it is obvious that the invention is not restricted to it but can be modified in many ways within the scope of the inventive idea disclosed in the attached claims.

What is claimed is:

1. A reception method in a cellular radio system including in each cell, at least one base station communicating with terminals located in its area and in which system Code Division Multiple Access is employed, wherein a received signal includes a sum signal of signals originating from several transmitters, the method comprising:

performing interference elimination and a simultaneous multi-user detection to said received signal, including generating an estimate for the received signal, wherein the estimate includes one or more estimates of a received user signal, and the effect of the symbols estimated on the symbol level is subtracted from the received sum signal, whereby a narrowband, symbol-level residual signal is obtained, correlating the received signal by a particular spreading code, whereby a first symbol-level signal is obtained, correlating the computed estimate by the same spreading code, whereby a second symbol-level signal is obtained, and subtracting the second symbol-level signal from the first symbol level signal, whereby a narrowband, symbol-level residual signal is obtained.

2. A method as claimed in claim 1 further comprising estimating parameters of unknown signal from the narrowband residual signal.

3. A method as claimed in claim 2, further comprising detecting by means of the estimated parameters the found signals using the simultaneous multi-user detection.

4. A method as claimed in claim 1, further comprising first conveying the sum signal to a number of matched filters in which parameters of known signals are estimated, and said known signals are conveyed to a detector in which the simultaneous multi-user detection is performed.

5. A method as claimed in claim 4, wherein the parameters comprise the signals' phase, amplitude and spreading code used.

6. A method as claimed in claim 4, wherein the signal parameters are estimated in parallel.

7. A method as claimed in claim 4, wherein the signal parameters are estimated sequentially.

8. A method as claimed in claim 4, further comprising, when some parameters of the unknown signals are known, these data are utilized when other parameters are searched.

9. A method as claimed in claim 1, wherein the residual signal comprises user symbols and the method further comprises combining the symbols incoherently.

10. A method as claimed in claim 1, wherein the residual signal comprises user symbols and the method further comprises combining that the symbols are combined coherently.

11. A method as claimed in claim 1, further comprising estimating parameters in several stages in such a manner that preliminary estimates are searched first, whereupon a more accurate, final estimate is estimated from among found, preliminary estimates.

12. A receiver in a cellular radio system including, in each cell, at least one base station communicating with terminals located in its area, in which system Code Division Multiple Access is employed, wherein a received signal includes a sum signal of signals originating from several transmitters, said receiver comprising:

means for performing interference elimination and a simultaneous, multi-user detection to the received signal, means performing interference elimination and a simultaneous multi-user detection to said received signal, including means for generating an estimate for the received signal, wherein the estimate includes one or more estimates of a received user signal, and the effect of the symbols estimated on the symbol level is subtracted from the received sum signal, whereby a narrowband, symbol-level residual signal is obtained, means for correlating the received signal by a particular spreading code, whereby a first symbol-level signal is obtained, means for correlating the computed estimate by the same spreading code, whereby a second symbol-level signal is obtained, and means for subtracting the second symbol-level signal from the first symbol level signal, whereby a narrowband, symbol-level residual signal is obtained.

* * * * *